United States Patent [19]

Bassett

[11] Patent Number: 4,688,613
[45] Date of Patent: Aug. 25, 1987

[54] ROUTER ATTACHMENT FOR SAW TABLES

[76] Inventor: Alvin L. Bassett, 10410 SE. Raymond, Portland, Oreg. 97266

[21] Appl. No.: 891,606

[22] Filed: Aug. 1, 1986

[51] Int. Cl.$^4$ .................................................. B25C 5/10
[52] U.S. Cl. ............................ 144/136 R; 144/134 R; 144/136 C; 409/172; 409/182
[58] Field of Search ............... 409/172, 182; 144/1 R, 144/1 F, 134 R, 134 A, 134 B, 134 D, 136 R, 136 C

[56] References Cited

U.S. PATENT DOCUMENTS

| | | | |
|---|---|---|---|
| 3,827,468 | 8/1974 | Markham | 144/136 R |
| 4,062,390 | 12/1977 | Beekenkamp | 409/182 |
| 4,155,383 | 5/1979 | Welliver | 144/134 D |
| 4,353,399 | 10/1982 | Harris | 144/144 R |
| 4,527,605 | 7/1985 | Ede et al. | 144/136 C |

FOREIGN PATENT DOCUMENTS 2037655  7/1980  United Kingdom ........... 144/134 D

Primary Examiner—W. D. Bray
Attorney, Agent, or Firm—John A. Hamilton

[57] ABSTRACT

A router attachment for a saw table having a raised work-guiding fence at one edge thereof, the attachment consisting of a horizontal arm attachable at one end to the table at the edge thereof carrying the fence, and extending laterally across the table so that a work piece being moved across the table may pass thereunder, the arm being vertically adjustable to accomodate work pieces of different thicknesses, a router base plate adjustably slidable along the arm to vary its spacing from the fence, and a powered router carried by the base plate and including a vertically oriented router bit projecting downwardly through an orifice of the base plate to form said work piece. If the fence itself is laterally adjustable relative to the table, a measuring device for accurately indicating the lateral spacing of the router bit from the fence despite adjustments of the fence is provided.

7 Claims, 3 Drawing Figures

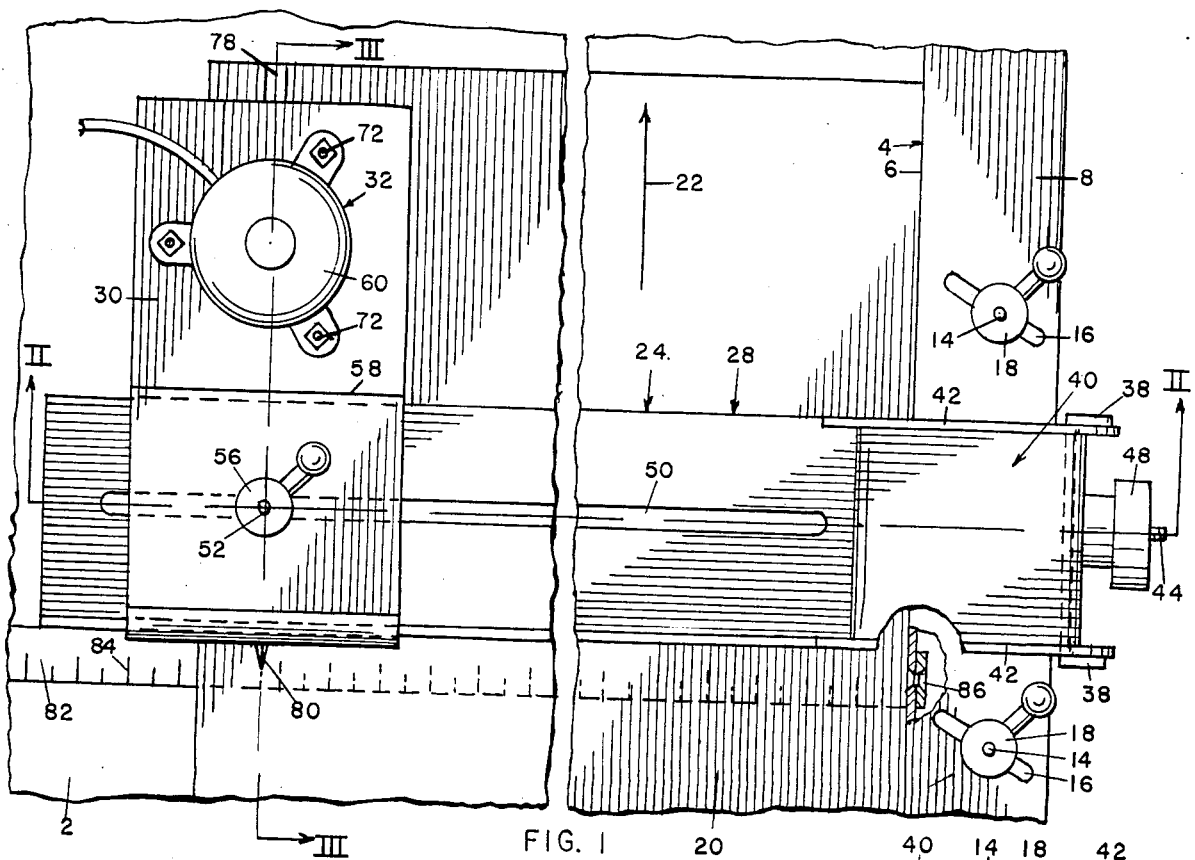
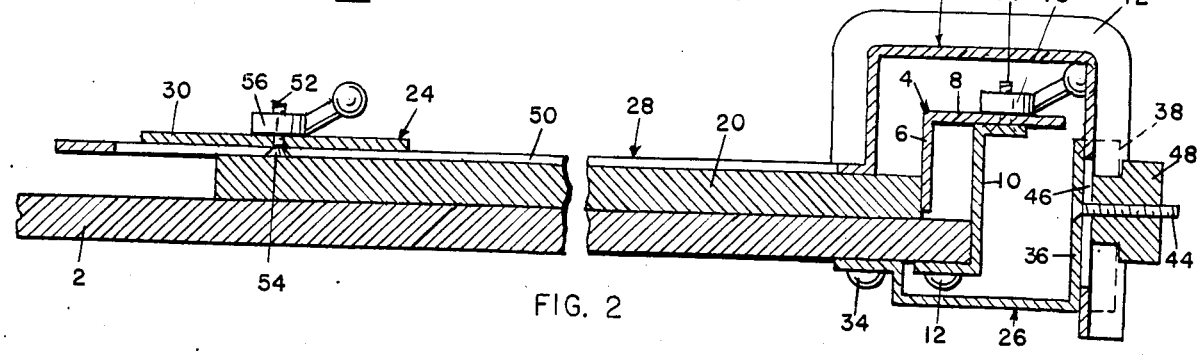
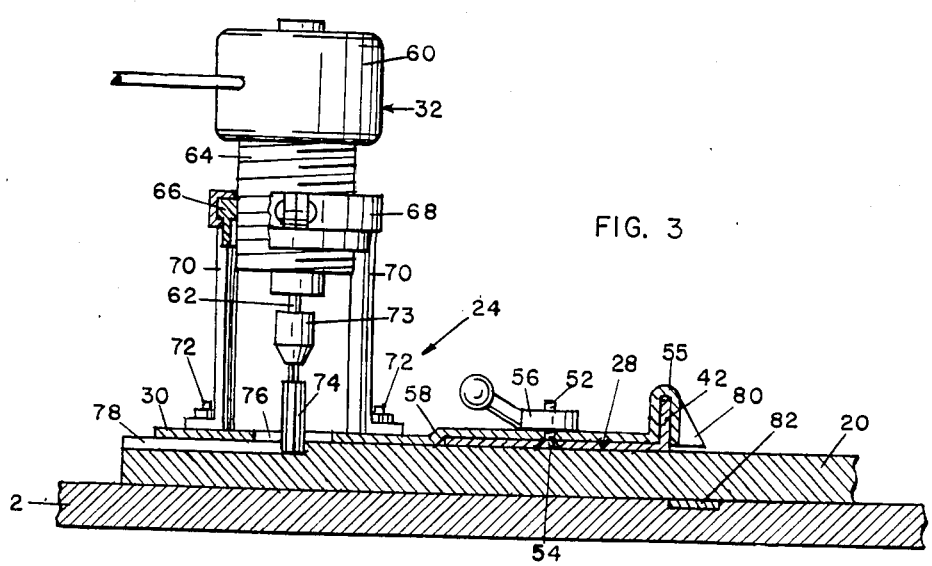

ROUTER ATTACHMENT FOR SAW TABLES

This invention relates to new and useful improvements in saw tables, and has particular reference to an attachment for a saw table by means of which routing cuts in the top surface of a board may be performed in the same pass of said board over the saw table during which other operations are performed on the board, in order to consolidate said operations and save valuable time. Examples of operations other than the routing which may be performed in the same pass of the board are dressing of a board edge and sawing of the board to a precise width. A specific example might be the production of end boards for dresser or cabinet drawers, in which the edge of the board which will eventually be its top edge is first dressed or shaped as desired, the board then sawed to a width corresponding to the height of the drawer, and a groove finally routed in what will eventually be the inside surface of the end board for receiving the bottom board of the drawer when said drawer is assembled. All three of these functions may be performed during a single pass of the board as it is guided over the table by a straight fence rising from an edge of the table. This is of course only one exemplary use of the router attachment. It may be put to many uses, and has a wide general utility.

The primary object of the present invention is the provision of a router mounted on an arm rigidly affixed to the table and extending horizontally in spaced apart relation thereabove, the router bit projecting downwardly from the arm to form cuts in a work piece guided thereunder as it passes over the table. If the work piece is moving in a straight line, being guided by the table fence, the router will cut a straight groove in the top surface of the work piece. However, the work piece may be moved manually in non-straight lines, and advanced and retracted vertically, to allow the router to cut free-form patterns, or internal cuts not extending through any edge of the work piece.

Another object is the provision of a device of the character described including means whereby the mounting arm of the router may be adjusted to vary the spacing of the router bit from the fence of the table, the provision of means whereby said spacing may be accurately measured despite the fact that the fence itself may be movable, and the provision of means whereby the vertical height of the router arm above the surface of the table may be adjusted, to the end that the base plate of the router may always rest directly on the top surface of the work piece, for better accuracy of work, even though work pieces of various thicknesses may be encountered.

Other objects are simplicity and economy of construction, and efficiency and dependability of operation.

With these objects in view, as well as other objects which will appear in the course of the specification, reference will be had to the accompanying drawing, wherein:

FIG. 1 is a fragmentary, foreshortened, top plan view of a saw table, showing a router attachment embodying the present invention operatively mounted thereon.

FIG. 2 is a sectional view taken on line II—II of FIG. 1, and

FIG. 3 is a sectional view taken on line III—III of FIG. 1.

Like reference numerals apply to similar parts throughout the several views, and the numeral 2 applies to the top slab of a saw table. Said top slab is horizontal, is supported at any desired elevation by legs or other suitable means, not shown, and may be of any desired dimensions. It is usually rectangular, and mounted along one straight edge thereof is a fence indicated generally by the numeral 4 and consisting of an elongated sheet metal angle having a vertical leg 6 parallel to the table top edge and extending into close proximity therewith, and a top leg 8 which is horizontal and extends outwardly from the top edge of the vertical leg, overlying the top surface of a bracket 10 which is secured to table slab 2 as at 12. At spaced points along the fence, bolts 14 are fixed at their lower ends in bracket 10, and extend upwardly through angled slots 16 formed in the horizontal top leg 8 of the fence, the fence being adjustably fixed to the bracket by said bolts and enlarged nuts 18 threaded thereon above the fence. By loosening said nuts, the fence may be adjusted normally to the associated edge of the table to vary the lateral spacing of the vertical fence leg 6 from said table edge. This adjustment is necessary since in some tables some functions are performed on a work piece 20 by other elements mounted on the table before the work piece reaches the particular portion of the fence shown in the drawing, as said work piece, which may be an ordinary board, is guided over the table manually in the direction of arrow 22. Some such prior operations, such as the shaping, forming or planing of the board edge, remove enough wood to reduce the width of the board substantially, and the fence portion shown must consequently be shifted inwardly to allow it to guide the work piece in a straight line even though there is then a "step" in the board width. The drawing shows only the portion of the table top, work piece and fence directly associated with the router attachment to be described.

The router attachment forming the subject matter of the present invention is indicated generally by the numeral 24, and consists generally of a bracket 26 at the fence edge of the table, an arm 28 mounted in bracket 26 and extending horizontally over the table normally to the fence, a router base plate 30 mounted on and adjustably movable along arm 28, and a router proper 32 mounted on base plate 30 and including a router bit projecting vertically downwardly through an orifice of the base plate.

Bracket 26 is formed of sheet metal, is affixed to the lower surface of table slab 2 as at 34, and includes a vertical reach 36 spaced outwardly from fence 4. The lateral edge portions 38 of said vertical leg are turned outwardly to impart to said vertical leg the form of a vertical channel. Arm 28 is also formed of sheet metal, extending over the top of the table slab at right angles to fence 4. At one end, said arm is provided with an inverted U-shaped extension 40 which bridges fence 4 and which is provided with flanges 42 at its lateral edges for strength and stiffness. The outer vertical leg of this U-shaped extension, which is channel shaped by reason of said flanges, is engaged slidably in the channel shaped vertical reach 36 of bracket 26, and adjustably fixed therein by a bolt 44 fixed in vertical reach 36, extending horizontally outwardly through a vertical slot 46 formed in the outer vertical leg of U-shaped extension 40, and having an enlarged, hand-operable nut 48 threaded thereon. The major portion of arm 28 projects horizontally across the table at right angles to the fence, and may be of any desired length, depending on the width of the table. This portion of the arm has an elongated slot 50 formed longitudinally therein.

Base plate 30 is also formed of sheet metal and is generally flat, being adjustably fixed to arm 28 above the table top by a bolt 52 having its head 54 of tapered form engaged in slot 50 for sliding movement longitudinally of said slot, then extending upwardly through base plate 30 and having a hand-operable clamp nut 56 threaded on its upper end. One of the flanges 42 of the arm extension extends the full length of the arm, and the base plate is provided at one edge with a channel formation 55 slidably engaged over said flange, in order to prevent any possibility of rotation of the base plate about bolt 52. The flange also stiffens the entire length of the arm and renders it more rigid. The base plate is generally rectangular, with one end thereof clamped to arm 28 and its other end extending at right angles to said arm. The arm may lie flat on table slab 2 or on work piece 20, and base plate 30 is offset downwardly at the edge of said arm, as indicated at 58, so that the laterally extended portion thereof may also rest flat on the table or work piece.

Router 32 is mounted on the extended portion of the base plate. Said router includes an electric motor 60 having its output shaft 62 extending vertically downwardly above the base plate, the housing 64 of said motor being threaded concentrically with shaft 62, and threadably engaged in a ring nut 66 which is in turn rotatably mounted in a mounting ring 68 encircling the motor housing. The mounting ring is supported at a fixed elevation above base plate 30 by angularly spaced legs 70 affixed at their upper ends to said ring, and affixed at their lower to the base plate by bolts 72 (see FIG. 3). Mounted on the lower end of output shaft 62 is a chuck 73 in which is mounted router bit 74 projecting downwardly through an orifice 76 formed in the base plate, to act on work piece 20. As long as the work piece 20 is moved in a straight line over the table, in the direction of arrow 22 in FIG. 1, the router bit will cut a straight groove 78 in the top surface of said work piece. Turning ring nut 66 will adjust the depth of the groove, the loosening of nut 56 and sliding movement of base plate 30 along the length of arm 28 will adjust the spacing of the groove from fence 4, and the loosening of nut 48 and vertical sliding of arm reach 36 in bracket 26 will allow arm 28 and base plate 30 to ride in direct contact with the work piece regardless of the thickness of said work piece. Such direct contact with the work piece is effective in preventing vibration of the router due to flexure of the arm, and is hence conducive to better accuracy and smoother operation of the router.

To assist the spacing the router bit accurately at a given lateral distance from fence 4, base plate 30 is provided with a pointer 80 extending therefrom laterally of arm 28. Said pointer is also aligned with the router bit transversely of the arm, and indicates the spacing of said bit transversely from fence 4 on a slide 82 movable in a matching groove formed in the top surface of table slab 2, at one longitudinal edge of arm 28. A scale 84 imprinted on said slide is calibrated to indicate distance from the operative inner surface of vertical leg 6 of the fence. In order to prevent this indication from being destroyed when the fence itself is shifted laterally after loosening nuts 18, as previously described, the slide is turned upwardly behind the outer surface of said vertical fence leg 6, and secured thereto as by a rivet 86, as shown in FIG. 1. Thus if the fence itself is adjusted laterally, the slide must also move with it.

The operation and use of the device is believed to be self-evident from the foregoing description of its construction. After loosening nuts 18, fence 4 is adjusted laterally of itself over the table, if this is required, as previously discussed, by the fact that a portion of the width of work piece 20 is to be removed in some other operation performed on said work piece by other equipment carried on the table, before the work piece arrives at the router. During this adjustment, scale 82 is of course moved with the fence, since it is connected thereto by rivet 86, so that the scale reading always reads directly the distance of any point thereon from the vertical leg 6 of the fence. Nut 56 may then be loosened, and base plate 30 moved along arm 28 until the router bit 74 is disposed at the desired distance from fence 4, as indicated by the reading of pointer 80 on scale 84 of slide 82. This of course determines the distance from the edge of the work piece riding against the fence that the router bit will form groove 78. This adjustment must of course be made before the work piece 20 is introduced beneath arm 28, so that the pointer may be viewed against the scale. It is also preferably made with arm 28 resting directly on the table slab, since the reading of pointer 80 on scale 84 may thus be made most accurate.

With nut 48 loosened, the extension 40 of arm 28 may be raised or lowered to such a degree that the major portion of said arm rests slidably on the top surface of work piece 20, whatever the thickness of said work piece may be. When the work piece is then moved over the table in the direction of arrow 22, guided by fence 4, the bit 22 of the router will cut groove 78 in the top surface of the work piece. The depth of the groove may be set by turning nut 66 relative to mounting ring 68, which adjusts the elevation of motor 60 and its housing 64 relative to said mounting ring. The direct engagement of substantially the full length of arm 28 with the work piece prevents shaking or vibration of the router bit which might otherwise occur due to the substantial inevitability of flexure of the arm. Of course, the work piece need not be maintained in constant engagement with fence 4, but may be separated from said fence and guided entirely manually. In this manner the router may be used to cut internal depressions of any desired contour in the top surface of a work piece. Also, by inserting a thin wood layer beneath the work piece into which the router bit can cut without reaching the table slab 2 itself, the router may be used to cut openings through the entire thickness of the work piece.

While I have shown and described a specific embodiment of my invention, it will be readily apparent that many minor changes of structure and operation could be made without departing from the spirit of the invention.

What I claim as new and desire to protect by Letters Patent is:

1. A router attachment for a saw table comprising:
  a. a raised fence disposed along one straight edge of said table and being operable to guide a work piece moved slidably over said table in engagement therewith to move in a straight path,
  b. a bracket mounted on said table,
  c. a generally horizontal arm connected at one end to said bracket and extending across the top of said table normally to the extent of said frame,
  d. a base plate connected to an extended portion of said arm and extending laterally from said arm, and
  e. a router mounted on said base plate and including a power driven bit rotatable on a vertical axis and projecting downwardly through an orifice of said base plate, whereby to form a router cut in a work piece supported on and moved over said table beneath said base plate.

2. A router attachment as recited in claim 1 with the addition of means whereby said arm may be adjusted vertically with respect to said bracket, whereby said base plate may be positioned to allow said work piece to move therebeneath in sliding contact therewith.

3. A router attachment as recited in claim 1 with the addition of means whereby said base plate may be moved adjustably along said arm, whereby the spacing of said router bit from said fence, laterally to the general extent of the latter, may be adjusted.

4. A router attachment as recited in claim 1 with the addition of means whereby the elevation of said router bit relative to said base plate may be adjustably varied, whereby to vary the depth of the router cut in said work piece.

5. A router attachment as recited in claim 1 with the addition of:
   a. means whereby said arm may be adjusted vertically with respect to said bracket, whereby said base plate may be positioned to allow said work piece to move therebeneath in sliding contact therewith,
   b. means whereby said base plate may be moved adjustably along said arm, whereby the spacing of said router bit from said fence, laterally to the general extent of the latter, may be adjusted, and
   c. means whereby the elevation of said router bit relative to said base plate may be adjustably varied, whereby to vary the depth of the router cut in said work piece.

6. A router attachment as recited in claim 1 wherein said bracket is mounted on said table at the edge thereof at which said fence is disposed, said bracket bridging over said fence to extend across said table, whereby all other edges of the table are unobstructed.

7. A router attachment as recited in claim 1 with the addition of means whereby said fence may be adjusted laterally of itself relative to the table, said bracket being mounted on said table independently of said fence whereby adjustment of said fence does not move said arm or said router, a slide mounted in said table flush with the top surface thereof and slidable in a direction normal to the general extent of the fence, said slide being calibrated to measure distance longitudinally thereof, means connecting one end of said slide to said fence whereby the former moves with the latter, and a pointer carried on said base plate and cooperating with the scale of said slide to measure the spacing of the router bit laterally from said fence.

* * * * *